United States Patent Office 3,513,644
Patented May 26, 1970

3,513,644
AIR FILTER
Edward D. Weil, Yonkers, N.Y., assignor to Stauffer Chemical Company, New York, N.Y., a corporation of Delaware
No Drawing. Filed Sept. 19, 1968, Ser. No. 760,961
Int. Cl. B01d *39/14;* C07d *105/02*
U.S. Cl. 55—524                          4 Claims

ABSTRACT OF THE DISCLOSURE

An air filter having as a dust adherent a coating of a liquid poly(haloethyl-ethyleneoxy) phosphoric acid ester having an average degree of condensation of from about 2 to about 10.

---

This invention relates to filters for separating out solid particles, such as dust, from air or other gaseous media. More particularly, the invention relates to a dust adherent coating on a porous base, such as a glass fiber base, through which the gaseous medium flows.

Impingement type air filters contain porous filter media or mats generally formed from plastic or glass fibers through which air is passed. The filter medium is coated with a stable non-volatile liquid dust adherent which entraps dust particles as they pass through the filter and prevents them from becoming re-entrained in the air stream. A desirable dust adherent should be inexpensive, odorless and have a large dust collecting capacity. It has been found that the adherent is effective while it remains relatively soft or in semi-fluid condition, thus solidification at low temperature or crystallization at low humidities causes substantial failure in operation. On the other hand, the efficiency of the filter is impaired if the material becomes so fluid at elevated temperatures or high humidities as to run or bleed from the base fibers or be blown off of the filter medium by the high air velocities encountered in some industrial uses such as diesel engine air filters. Also, in the recently developed automatic replacement filters, the dust adherent liquid coating tends to be squeezed out when the filter medium is tightly wound around spools. Of further importance is the reaction of the adherent to high temperatures and flames; that is, it should be non-inflammable and non-combustible and should not create fumes or smoke of such volume, density or kind as to be toxic.

Referring briefly to the adhesive materials that have been used, petroleum oils, bodied or unbodied, and with or without bodying agents, such as soaps, have been employed but they are objectionable because they not only slowly run or bleed from the base but also the oily substances are inflammable. Flame-proofing chlorinated compounds, such as chlorinated diphenyl, have been added to these oils, but, when used in amounts to be effective in reducing the combustibility of the adhesive, they form a sludge or solid mass with oil, which as previously pointed out, is undesirable.

Use has been made of the deliquescent salts or metal halides, such for example as zinc chloride, tin chloride or lithium chloride, but these materials are corrosive to metal frames and duct work in the presence of moisture, and may crystallize out at very low humidities. Organic esters of phosphoric acid, such as tricresyl phosphate, although not combustible, decompose at elevated temperatures and phosphorus in the form of phosphorus pentoxide ($P_2O_5$) appears as a part of the decomposition products in the form of dense white fumes. Another organic ester of phosphoric acid, i.e., tris(2-chloroethyl) phosphate lacks the necessary viscosity for air filter use and when combined with a thickener is volatile at low temperatures.

It has been found that an improved dust adherent which is inexpensive, odorless, non-corrosive, and which has a large dust catching capacity can be provided to form an air filter which overcomes the aforelisted problems.

In accordance with the present invention there is provided an air filter comprising a porous fibrous filtering base and a particle adherent coating thereon which coating is a liquid poly(haloethylethyleneoxy) phosphoric acid ester admixture having an average degree of condensation of from about 2 to about 10 and which can be prepared by heating a reaction mixture of (2-haloethyl) phosphorus compounds containing from about 50% to 100% by weight of tris(2-haloethyl) phosphate and from 0% to about 50% by weight of a phosphoric acid ester having at least one 2-haloethyl substituent thereon to a temperature within the range of from about 170° C. to about 220° C. in the presence of a basic catalyst for a period of time sufficient to generate reaction by-product ethylene dihalide in an amount of from about 0.5 mole to about 0.9 mole per mole of 2-haloethyl phosphorus compound in the reaction mixture. The reaction product is a self-extinguishing composition having viscosities within the range of 800 to 31,000 centipoises (measured on a Brookfield viscosimeter at 12 revolutions per minute) at 25° C. and is non-fuming, non-combustible, odorless, low in cost and efficient in removing dust particles from the air.

Tris(2-haloethyl) phosphate is a known class of compounds which can be easily prepared by known methods. These compounds are preferably the chloro or bromo derivatives. The term tris(2-haloethyl) phosphate is also intended to include mixed halo derivatives and also mixtures of derivatives as well as pure tris compounds themselves. Preferably, the chloro derivatives are utilized in the form of tris(2-chloroethyl) phosphate.

The tris(2-haloethyl) phosphate constitutes the major proportion of the reaction mixture used in the polycondensation reaction of the present invention. Preferably, the reaction mixture is constituted solely of the tris(2-haloethyl) phosphate compound though the reaction mixture can also contain a minor proportion, i.e., from 0% to about 50% by weight of another ester of phosphoric acid having at least one 2-haloethyl substituent thereon. As with the tris esters, the 2-chloroethyl derivative is preferred. The remaining ester groups can be any organic radicals which do not interfere with the polycondensation reaction and these can be illustrated by lower alkyl groups of from 1 to 10 carbon atoms, e.g., methyl, ethyl, propyl, butyl and the like; aryl, eg.g., phenyl; substituted alkyl, e.g., chloroethyl, hydroxypropyl and arylalkyls, e.g. benzyl or α-methylbenzyl; substituted aryls, such as alkaryl, e.g., tolyl, xylenyl, isopropylphenyl, t-butylphenyl or chlorophenyl; haloalkyls, such as chloroisopropyl, dichoroisopropyl, bromo-chloroisopropyl, 2,3-dibromopropyl; and the like. These are given as illustrative and are in no way intended to be inclusive of all such compounds.

The polycondensation reaction is conducted in the presence of a basic catalyst. Suitable bases include alkali metal and alkaline earth metals, such as sodium, potassium, magnesium, calcium and the like; their oxides, such as sodium oxide, potassium oxide, magnesium oxide, calcium oxide, and the like; hydroxides, such as sodium hydroxide, potassium hydroxide, magnesium hydroxide, calcium hydroxide and the like; carbonates, and bicarbonates, such as sodium carbonate and bicarbonate, potassium carbonate and bicarbonate, magnesium carbonate and bicarbonate, calcium carbonate and bicarbonate and the like; alkoxides, such as sodium ethoxide, potassium ethoxide, magnesium ethoxide, calcium ethoxide and the like; phenolates, such as sodium phenolate, potassium phenolate, magnesium phenolate, calcium phenolate and the like, and salts of strong bases and weak acids such as alkali metal and alkali earth metal acetates, and phosphates, and salts of organic phosphorus acids and partial phosphate esters. Organic bases such as amines, for examples, pyridine, quinoline, triethylamine, tetramethylguanidine, N-methylmorpholine, butylamine, aniline, and the like may be used. The definition of bases in the context of the present invention extends to those substances known as "Lewis bases," that is, electron pair donors, and thus includes, for example, trialkylphosphines, triphenyl phosphines, tributyltin oxide and the like. The true catalyst is belived to be the anion of a salt of bis(2-haloethyl) phosphate prepared in situ by the cleavage of tris(2-haloethyl) phosphate with a salt whose anion is sufficiently nucleophilic to effect the cleavage. Thus, substances not normally considered bases such as alkali metal halides, e.g., sodium chloride, sodium bromide and the like, potassium chloride, potassium bromide and the like, are included within the term basic catalyst as used herein in as much as they are sufficiently nucleophilic to effect the desired cleavage. Suitable quantities of base for catalytic purposes are from a few parts per million, e.g., 50 p.p.m. up to about 10% by weight, preferably 0.01–5% based on the weight of the reaction mixture.

The base catalyst can be liquid or solid as desired. Suitable solid basic compounds are alkali and alkaline earth metals and their salts, such as sodium or potassium hydroxide, sodium or potassium carbonate or bicarbonate, sodium alcoholate, and finely divided metallic sodium or potassium. The addition of the solid basic compound or alkali metal is accomplished by stirring the tris(2-haloethyl) phosphate with solid sodium or potassium hydroxide as pellets or flakes or with coarsely pulverized alkali carbonate or finely divded metallic sodium or potassium at room temperature 0.01–5% by weight of solid basic compound or alkali metal, calculated on the tris(2-haloethyl) phosphate, is stirred in. The amount of solid basic compound or alkali metal thus dissolved can be determined by a simple titration.

The reaction mixture is then heated to a temperature within the range of from about 170° C. to about 200° C. for a period of time sufficient to generate by-product ethylene dihalide in an amount of from about 0.5 mole to about 0.9 mole ethylene dihalide per mole of 2-haloethyl phosphorus compound in the reaction mixture. The heating can be conducted in any type of appropriate reaction vessel, preferably a reaction vessel having a distillation apparatus attached thereto. The amount of ethylene dihalide formed during the polycondensation reaction can be easily determined by stripping the by-product ethylene dihalide as it is formed during the reaction and determining the amount obtained until such time as the desired reaction end point is reached, at which point the reaction can be terminated.

The amount of ethylene dihalide formed during the polycondensation reaction is an indication of the degree of condensation. After generation of approximately 0.5 mole of ethylene dihalide per mole of 2-haloethyl phosphorus compound in the reaction mixture, a product having an average molecular structure of the dicondensation product is obtained. After approximately 0.9 mole of ethylene dihalide has been liberated, or generated within the reaction mixture, the product has an average degree of condensation of approximately 10. Above this point the product begins to become too viscous to utilize as an air filter coating. By controlling the amount of ethylene dihalide generated in the reaction, the polycondensation reaction can be controlled so as to provide products having various degrees of condensation and, also, various degrees of viscosities. By controlling the amount of ethylene dihalide generated within the range of from about 0.5 mole ethylene dihalide to about 0.9 mole ethylene dihalide per mole of 2-haloethyl phosphorus compound, products having relative degrees of condensation of from approximately 2 to about 10 which are characterized by viscosities within the range of 800 to 31,000 cps. can be prepared making the products useful as dust adherents for air filter media. Preferably, the viscosity of the product is above 3,000 cps.

The filter medium can be of the conventional glass fiber mat type though other filter mediums such as metal, paper, cellulosic materials and the like can also be used. Preferably, the filter medium is the form of a mat or pad. This pad is generally enclosed between grills of perforated metal or paper facings that overlie the major faces of the pad. The air or gaseous medium to be filtered passes in turn through one of the grills, through the pad in the direction of its thickness, and out the other grill. The pad and grills are usually secured together by a frame or container that encloses the edges and margins of the pad and the grills. An air filter unit of this type is shown in Mayer's U.S. Pat. No. 2,077,951. The filter medium can also be in the form of a long roll of fiber mat. This type of filter is generally used in industrial applications where the air to be filtered contains extensive quantities of particulate matter such that the filter has to be continuously changed so as to provide effective filtration of the flowing air. The dust adherent of the present invention is particularly adapted for use in these roll type filters in as much as its viscosity can be high enough to prevent its being forced out of the roll during shipping and use.

The dust adherent of the present invention can be applied to the filter medium by any known method such as spraying, dipping, or other such impregnation techniques as desired. The amount of adherent utilized is that amount necessary to wet the surface of the filter medium so as to provide a stable and effective filter. The dust adherent coatings of the present invention can be used alone or in combination with other agents commonly used in air filter dust adherents such as bodying agents and/or surfactants. Materials of these types are more fully illustrated in U.S. Pat. 3,390,005 issued June 25, 1986. With regard to glass fibers, the inherently smooth surfaces of the fibers require little adherent for effective results in as much as the fiber surfaces are non-absorbent.

The present invention will be further illustrated in the examples which follow.

EXAMPLE 1

A glass cloth is impregnated with 10% by weight of a liquid product having a viscosity of 17,000 cps. measured at 25° C., prepared by heating tris(2-chloroethyl) phosphate to a temperautre of 172–192° in the presence of sodium carbonate until approximately 0.83 mole of ethylene dichloride per mole of tris(2-haloethyl) phosphate is liberated. This approximates an average degree of condensation of about 7. Air containing suspended dust particles is passed through the treated cloth and the exit air is found to be free of dust particles. The filter medium is self-extinguishing when ignited by a flame.

A similar experiment using tris(2-chloroethyl) phosphate showed that the viscosity of the phosphate was too low for effective use so that a thickener had to be added. The experiment further showed that such mixture is volatile at low temperatures and therefore ineffective for use as a dust-catching agent for air filters.

EXAMPLE 2

A roll of glass mat is impregnated with a product having a viscosity of 865 cps. measured at 25° C. prepared by heating 428.2 grams (1.5 mole) of tris(2-chloroethyl) phosphate to a temperature of about 190° C. in the presence of 2.1 grams sodium carbonate until approximately 89 grams (0.9 mole) of ethylene dichloride (0.6 mole ethylene dichloride per mole of tris(2-chloroethyl) phosphate) is liberated. This approximates an average degree of condensation of from about 2.2 to about 2.4. Dust laden air is effectively filtered by the filter medium and the filter is self-extinguishing when ignited by a flame.

EXAMPLE 3

A similar filter is prepared as in Example 1 using a reaction product of tris(2-chloroethyl) phosphate having a viscosity of about 31,000 cps. measured at 25° C. which is prepared by heating tris(2-chloroethyl) phosphate under the conditions stated in Example 2 until from about 0.89 mole of ethylene dichloride per mole of tris(2-chloroethyl) phosphate is liberated. An effective air filter which is self-extinguishing when ignited by a flame is obtained.

EXAMPLE 4

A mixed 2-chloroethyl dichloroisopropyl phosphate is prepared by adding 279.5 g. (3 moles) of epichlorohydrin to 307 g. (2 moles) of phosphorus oxychloride at 55–65° over two hours in the presence of 1 g. of titanium tetrachloride catalyst and then treating the intermediate dichloroisopropyl phosphoro (di)chloridate with ethylene oxide at 55–60° until no further weight uptake occurs (four hours). This phosphate, which comprises a mixture of esters having about 1.5 chloroethyl and 1.5 dichloroisopropyl groups per molecule, is condensed to an oligomeric phosphate by heating 179 g. of it with 1 g. of sodium carbonate at 195–200° for six hours with the liberation of 22.6 g. of ethylene dichloride. The resultant residual liquid in the reactor has a viscosity of about 2000 cps. at 25° and is effective as an air filter medium having self-extinguishing properties.

The preceding examples have illustrated the present invention using the 2-chloroethyl phosphorus compound. With equal facility 2-bromoethyl phosphorus compounds can also be utilized therein.

What is claimed is:
1. A filter comprising a porous fibrous filter base and a particle adherent coating thereon which coating is of liquid poly(haloethylethyleneoxy) phosphoric acid esters having an average degree of condensation of from about 2 to about 10 prepared by heating a reaction mixture of (2-haloethyl) phosphorus compounds containing from about 50% to 100% by weight of tris(2-haloethyl) phosphate and from 0% to about 50% by weight of a phosphoric acid ester having at least one 2-haloethyl substituent thereon to a temperature within the range of from about 170° C. to about 220° C. In the presence of a basic catalyst for a period of time sufficient to generate reaction by-product ethylene dihalide in an amount of from about 0.5 mole to about 0.9 mole ethylene dihalide per mole of 2-haloethyl phosphorus compound in said reaction mixture.
2. A filter as recited in claim 1 wherein said reaction product consists of polycondensed tris(2-chloroethyl) phosphate.
3. A filter as recited in claim 1 wherein said filter base is a mat of glass fibers.
4. A filter as recited in claim 3 wherein said mat is of the roll type as used in continuously moving filters.

References Cited

UNITED STATES PATENTS

| | | | |
|---|---|---|---|
| 2,178,614 | 11/1939 | Slayter | 55—524 |
| 2,692,654 | 10/1954 | Pryor | 55—524 |
| 3,109,816 | 11/1963 | Feng et al. | 260—920 |
| 3,221,480 | 12/1965 | Stefcik et al. | 55—524 |
| 3,375,305 | 3/1968 | Patton et al. | 260—982 |
| 3,417,164 | 12/1968 | Patton et al. | 260—982 |

HARRY B. THORNTON, Primary Examiner

B. NOZICK, Assistant Examiner

U.S. Cl. X.R.

260—920